United States Patent [19]
Guyer

[11] Patent Number: 5,918,805
[45] Date of Patent: Jul. 6, 1999

[54] SELF-POWERED SPACE HEATING SYSTEM

[75] Inventor: Eric C. Guyer, Dover, Mass.

[73] Assignee: Yankee Scientific, Inc., Medfield, Mass.

[21] Appl. No.: 09/007,262

[22] Filed: Jan. 14, 1998

[51] Int. Cl.[6] .................................................. F24D 3/00
[52] U.S. Cl. .......................... 237/8 A; 237/2 R; 237/2 A
[58] Field of Search .............................. 237/13, 19, 9 R, 237/8 A, 2 R, 2 A; 265/85

[56] References Cited

U.S. PATENT DOCUMENTS

| | | | |
|---|---|---|---|
| 1,551,438 | 8/1925 | Staley | 126/101 |
| 2,130,894 | 9/1938 | Muir | 126/101 |
| 2,596,968 | 5/1952 | Harris et al. | 60/105 |
| 2,822,136 | 2/1958 | Dalin | 237/17 |
| 2,827,893 | 3/1958 | Ribaudo et al. | 126/101 |
| 2,833,268 | 5/1958 | Warren | 126/101 |
| 3,198,190 | 8/1965 | Gordon | 126/101 |
| 3,393,515 | 7/1968 | Tabor et al. | 60/64 |
| 4,124,178 | 11/1978 | Burke | 237/19 |
| 4,210,102 | 7/1980 | Dosmann | 122/20 B |
| 4,298,311 | 11/1981 | Ritzi | 415/80 |
| 4,344,569 | 8/1982 | Gardner . | |
| 4,418,538 | 12/1983 | Heinrich | 60/646 |
| 4,437,308 | 3/1984 | Fischer | 60/514 |
| 4,768,495 | 9/1988 | Zifferer | 126/101 |
| 5,046,478 | 9/1991 | Clawson | 126/110 R |
| 5,544,645 | 8/1996 | Armijo et al. | 126/101 |

*Primary Examiner*—Henry Bennett
*Assistant Examiner*—Derek Boles
*Attorney, Agent, or Firm*—Cesari and McKenna, LLP

[57] ABSTRACT

A self-powered, forced hot air space heating system including a boiler for generating steam, a mechanical power producing steam expander, and a heat exchanger for heating air. Steam from the boiler is supplied to the expander and the heat exchanger, which is disposed in close proximity to the boiler. A fan powered by the expander is mounted adjacent to the heat exchanger in order to force air to be heated past the heat exchanger and through the space being heated. By operation of the fan, cool air is forced past the heat exchanger and heated. The resulting warm air is then provided to the space being heated. The system provides central forced hot air heating without the need for any external supply of electrical power. In another embodiment, a hot water heater is used in place of the boiler to heat high pressure water. The high pressure hot water is expanded to obtain mechanical energy for driving a generator and, thereby, producing a supply of electrical power. Hot water and steam from the expander are passed through a heat exchanger and an air blower, powered by the generator, may move cool room air past the heat exchanger and into the corresponding space. Alternatively, the hot water and steam from the expander may be used to heat a second supply of water that may then be forced to a plurality of radiators within the space being heated by a pump powered by the generator.

14 Claims, 5 Drawing Sheets

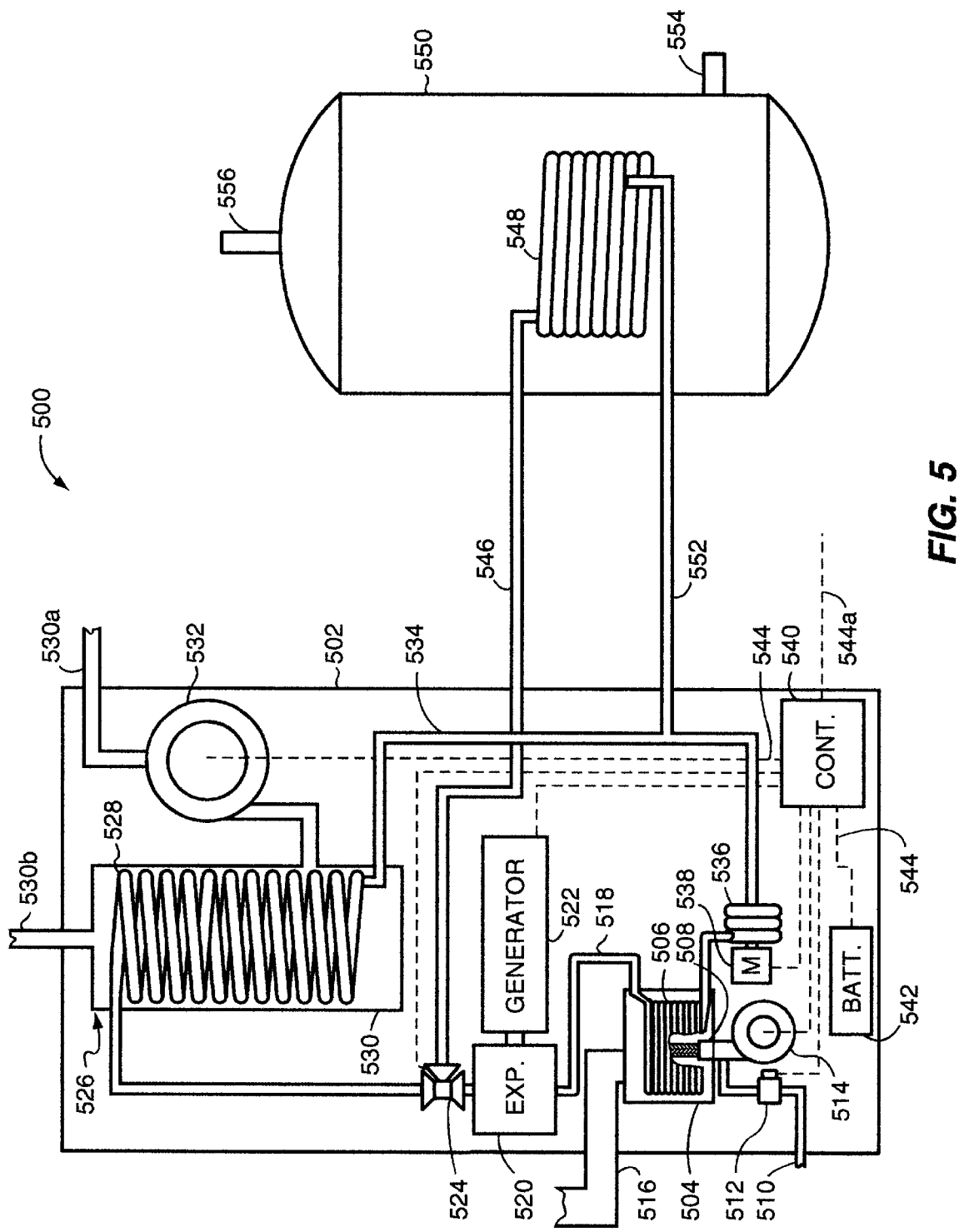

SELF-POWERED SPACE HEATING SYSTEM

FIELD OF THE INVENTION

The present invention relates generally to heating systems, and more specifically, to a self-powered, space heating system.

BACKGROUND OF THE INVENTION

Many commercial buildings as well as homes are heated by forced hot air furnaces. These furnaces typically include a boiler using an oil or gas-fired burner, a heat exchanger, and an air blower or fan. The heat exchanger typically comprises a plurality of passageways through which steam from the boiler flows. The fan is mounted next to the heat exchanger such that cool air may be forced past the heat exchanger and heated. The fan, which is typically powered by an electric motor, also moves the heated air through the building or home via an arrangement of ducts leading to the various rooms. An electric thermostat operably connected to the burner and the fan is often used to control the furnace. The thermostat switches the furnace on (e.g., activates the burner and the fan) whenever the temperature at the thermostat falls below a preselected level. Operation of the furnace brings warm air into the home. When the temperature at the thermostat exceeds another preselected level, the thermostat shuts the furnace off, thereby suspending the flow of heated air.

One of the main disadvantages of such furnaces is their dependence on electricity. As described above, such furnaces generally include an electrically powered fan to move air past the heat exchanger and through the building or home being heated. In addition, electric power is often used to operate the thermostat and to control the burner. For a 100,000 Btu/hour residential forced hot air furnace, for example, the electric power requirement is typically between 0.5 to 1.0 kilowatts. Furthermore, if the electricity delivered to the furnace is interrupted for whatever reason, the furnace is rendered inoperable. That is, without electric power, the thermostat, the burner and the motor that drives the fan will not work, thereby stopping the flow of warm air to the space(s) being heated.

Since electric power is often lost during blizzard conditions or other cold weather storms, the concomitant loss of the furnace's heating ability during periods of otherwise large demands for heat can have serious consequences. For example, if the power is disrupted for any length of time, the building or home can become so cold as to be uninhabitable. In addition, the temperature in the building or home may fall below freezing, causing water pipes to burst. The resulting water damage can be substantial.

In addition to forced hot air heating systems, many older homes and buildings use a steam heating system. With these systems, steam from the boiler is distributed to a series of radiators disposed throughout the building using its own pressure energy. However, the cost of steam distribution systems is relatively high compared to modern forced hot air heating systems. Additionally, forced hot air systems can be easily modified to provide both heating and air conditioning. Accordingly, for reasons of economy and convenience, forced hot air is now the most widely used heating system, despite the disadvantage described above.

One heating system that combined aspects of both steam heating and forced hot air heating was the SelecTemp system from Iron Fireman Manufacturing Company. As shown in the corresponding Application, Installation and Service Manual, the SelecTemp system, which has not been in production for many years, included a central steam boiler that provided steam to each of the rooms being heated. A mini heat exchanger and fan combination was located in each room. Steam from the boiler was delivered to the heat exchanger and to a small turbine that operated the fan. The steam was thus utilized to power the fan and to generate the heat that was subsequently forced into the room by the small fan. Condensate from each heat exchanger and fan combination drained back to the boiler in a return piping system separate from the steam supply piping. The condensate was collected in a common sump at atmospheric pressure and was returned to the central boiler by a pump. The pump was either powered electrically or by the steam produced from the boiler (e.g., by another small turbine with its own steam supply line). Although the SelecTemp system, including the steam-powered return pump, was not dependent on electricity, it was disadvantageous for several reasons.

First, the configuration of multiple heat exchangers in separate rooms and a common sump precluded the system from being operated or producing heat at more efficient vacuum steam temperatures and pressures. That is, in order to equalize the pressure at each heat exchanger and thereby ensure the return of condensate to the sump, the SelecTemp system specifically required that the condensate pump be vented to atmospheric pressure. By venting the condensate pump to atmospheric pressure, the heat exchangers were forced to operate at or somewhat above atmospheric pressure. For boilers manufactured in accordance with the American Society of Mechanical Engineers (ASME) Pressure Vessel and Boiler Code (Section IV, Heating Boilers), moreover, the maximum steam pressure that may be generated by such boilers is about 10 psig. Accordingly, the corresponding pressure ratios at the turbines was relatively low, and thus the available pressure energy that could be extracted to drive the fans was extremely limited. Indeed, in the SelecTemp system, the amount of mechanical power that could be extracted from the steam to power the fan is only about half that which would be available if the heat exchanger were capable of being operated at vacuum steam pressure.

Another major disadvantage of the SelecTemp system is that the boiler must be maintained at or near its full working pressure and temperature in order for the system to provide heat. That is, to achieve condensation at the heat exchangers (which operated at or somewhat above atmospheric pressure) and thereby heat the rooms, the steam being supplied to the heat exchangers needed to be at least 212 degrees Fahrenheit and positive pressure (relative to atmospheric). Once the boiler stopped producing positive pressure steam at 212 degrees Fahrenheit, the heat transfer process ceased. Accordingly, the energy used to bring the boiler to its operating pressure and temperature, which was often substantial due to the large mass of most cast iron boilers, was not available for heating the building. A significant amount of heat energy supplied by the burner was thus never realized.

The SelecTemp system was also relatively complex and expensive to manufacture, install and maintain. In particular, the system included a separate heat exchanger, fan, turbine and control valve in each room within the space being heated. These numerous working parts, which were dispersed throughout the building, added to the system's complexity and cost. The SelecTemp system further required that steam be provided (typically by ¼ inch copper tubing) to each room, resulting in significant thermodynamic losses. In addition, in order to drain accumulating condensate from these lines, steam traps were required, which were prone to leakage, thereby causing additional problems.

The SelecTemp system also did not lend itself to easy installation in existing homes as a replacement furnace, especially for forced hot-air furnaces. That is, the system was generally a completely new installation requiring substantial construction work to provide steam pipes running from the boiler to the heat exchanger/fan combination in each room. Thus, one could not readily convert an existing, conventional forced hot-air furnace to the SelecTemp system.

SUMMARY OF THE INVENTION

It is an object of the present invention to provide a self-powered, forced air, central space heating system that does not require electricity.

It is a further object of the present invention to provide an efficient, self-powered heating system that is less costly to install and maintain than the prior art systems.

It is a further object of the present invention to provide a heating system capable of generating excess electrical power.

Briefly, the invention is a self-powered heating system including a boiler for generating steam, an expander for extracting mechanical energy from the steam and a heat exchanger for transferring heat energy from the steam to room air. The boiler preferably includes a burner extending therein for heating water. Steam from the boiler is supplied to the expander and the heat exchanger which are preferably within the same housing as the boiler or at least disposed in close proximity thereto. A fan or blower is mounted adjacent to the heat exchanger in order to force room air to be heated past the heat exchanger and through the space being heated. A pump returns condensate from the heat exchanger to the boiler. Significantly, the mechanical power for the fan and pump is provided by the expander. In particular, the expander receives low pressure steam from the boiler and expands it to a pressure preferably below atmospheric thereby extracting sufficient energy to power the fan and the pump. The system is preferably operated by thermoelectric controls including an adjustable thermostat for setting the temperature of the space being heated. Notably, neither the thermoelectric controls nor the burner require external electric power for operation. Accordingly, the forced hot air heating system of the present invention is not dependent upon a supply of electrical power in order to provide heat from a central source. Instead, the system operates solely on the steam provided from the boiler.

Specifically, when the temperature at the thermostat falls below the selected temperature, a signal (e.g., a call for heat) is sent activating the burner and causing the boiler to generate steam. The steam powers the expander which, in turn, drives the fan and the pump. Steam exhausted from the expander is condensed in the heat exchanger in order to heat room air being forced across the heat exchanger by the fan, which also delivers the warm air throughout the building via an arrangement of ducts. Condensate exiting the heat exchanger is then returned to the boiler by the pump. When the temperature at the thermoelectric controls exceeds another preselected level, the burner is deactivated, eventually suspending the delivery of warm air.

Significantly, the operating fluid (i.e., water and steam) is sealed from the atmosphere. Accordingly, at any point in the system, steam pressures above and below atmospheric pressure (i.e., vacuum pressure) may be present. The ability to operate over a range of pressures including vacuum pressures, moreover, permits the generation of sufficient mechanical energy to power a central fan or blower and a pump, unlike the prior art system. In addition, the boiler is capable of generating useful steam for operating the expander and delivering heat to the building even after the burner is de-activated and the boiler begins to cool down.

The heating system may also be used to heat a domestic hot water supply. More specifically, steam generated by the boiler may be selectively provided to a coil disposed within a hot water supply tank. By circulating steam through the coil, the water in the tank may be heated. Hot water may then be drawn out of the tank and replaced with cold water. Steam or condensate exiting the coil is then returned to the boiler.

In a further embodiment, a plurality of heat exchangers and fans may be located in close proximity the boiler to provide zoned heating. Each heat exchanger and corresponding fan is preferably associated with a different segment of the arrangement of ducts leading to the various rooms of the space being heated. By providing steam to a selected heat exchanger, the temperature in the rooms associated with that heat exchanger may be controlled independently of the other rooms or zones corresponding to another heat exchanger(s).

In a still further embodiment, a high pressure water heater may be used in place of the boiler. With this system, high pressure water is heated near its boiling point at the corresponding operating pressure. This hot, high pressure water is then provided to an expander which extracts mechanical energy in order to operated a generator. Steam and hot water exiting the expander is provided to a heat exchanger and is available to heat room air. A fan or blower mounted proximate to the heat exchanger for forcing room air past the heat exchanger is powered by the electrical energy supplied by the generator. Condensate exiting the heat exchanger is returned to the water heater and the water supply is maintained at its high operating pressure by a water pump also powered by the electrical energy from the generator. Indeed, when operating at preferred water pressures and temperatures, excess electrical energy is created by the generator which may be utilized in the corresponding building or home or applied to the corresponding electric power grid.

BRIEF DESCRIPTION OF THE DRAWINGS

The above and further advantages of the invention may be better understood by referring to the following description in conjunction with the accompanying drawings, in which:

FIG. 5 is a block diagram of still another embodiment of a self-powered heating system in accordance with the present invention.

DESCRIPTION OF THE PREFERRED EMBODIMENT

Figure 1:
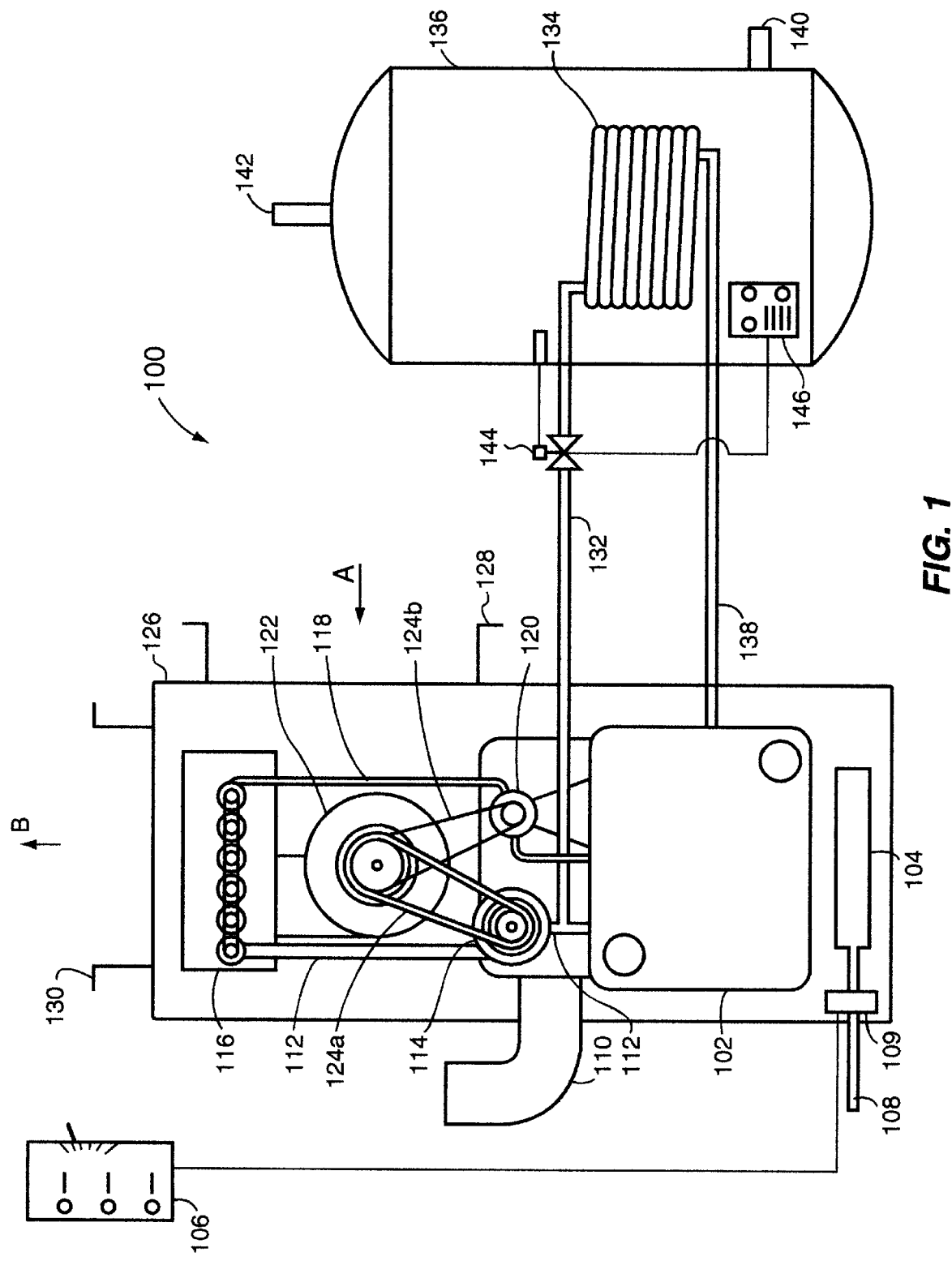
FIG. 1 is a block diagram of a self-powered heating system in accordance with the present invention.

FIG. 1 illustrates a self-powered heating system 100 in accordance with the present invention. The heating system 100 includes a boiler 102 for generating steam. Extending into the boiler 102 is a burner 104. The burner 104, which is activated by a controller 106, preferably burns a gaseous hydrocarbon fuel which may be provided by a gas line 108 and regulated by a fuel valve 109. Nonetheless, it should be understood that alternative fuels may also be used. The controller 106 includes a thermostat (not shown) which may be located within a room in the space being heated. Exhaust products resulting from the combustion of fuel by the burner 104 are preferably disposed via an exhaust stack 110. Steam generated by the boiler 102 preferably exits via a supply line 112. The steam supply line 112 is connected to an expander 114 and then to a steam condensing heat exchanger 116. A return line 118 carries condensate exiting the heat exchanger 116 back to the boiler 102 through a condensate pump 120. Lines 112 and 118, together with expander 114, heat exchanger 116 and pump 120, represents the circulation path for the working fluid (e.g., water-steam) utilized by the heating system 100.

The expander 114 is used to power a central fan or blower 122 that is located adjacent to the heat exchanger 116. The expander 114 may be operably connected to the fan 122 via a first endless belt 124a such that rotation of the expander 114 under the supply of steam from the boiler 102 drives the fan 122. The expander 114 may also be used to drive the condensate pump 120 from a second endless belt 124b running off of the fan 122. The expander 114 can be any type of positive displacement or turbodynamic device for converting steam pressure energy to mechanical power, such as a reciprocating piston engine, turbine, or rotary vane "motor". For the typical installation of system 100 (e.g., a residential or small commercial building), expander 114 preferably produces approximate 0.75 kW of power to drive the fan 122 and pump 120. A suitable expander for use in the present invention may be of a design similar to that of a conventional rotary sliding vane motor operated with compressed air, especially those designed to operate with no lubrication. Such a compressed air motor would need to be converted to operate on steam.

It should be understood that other means besides an arrangement of endless belts 124a, 124b may be used to supply power from the expander 114 to the fan 122 and pump 120. For example, a series of gears, a direct shaft coupler, or an electric generator/motor set may be used to transmit power from the expander 114 to the fan 122 and pump 120. Alternatively, the expander 114 and pump 120 may be a single combined unit. The boiler 102, moreover, is preferably built to the standards of the ASME Pressure Vessel and Boiler Code Section IV.

The boiler 102, expander 114, heat exchanger 116, pump 120 and fan 122 are all preferably disposed within a single housing 126. The housing 126 includes an air inlet 128 for receiving room air to be heated and an air outlet 130. The air outlet 130, in turn, is connected to an arrangement of ducts (not shown) which lead to one or more of the various rooms of the space being heated. Accordingly, the entire heating system 100 (not including the ducts) may be located in a single room (e.g., the basement) of the space being heated, unlike to the prior art SelecTemp system.

In operation, when the temperature at the thermostat falls below a preselected level, the controller 106 transmits a signal (e.g., a call for heat) activating the burner 104. The controller 106 preferably utilizes conventional millivolt thermoelectric controls to operate the burner 104. A suitable controller for use in system 100 is a Honeywell Model VS820A1047 Combination Gas Control, which utilizes energy from a pilot light at the burner 104 to open the fuel valve 109. Activation of the burner 104 causes water in the boiler 102 to be heated, thereby producing steam which exits the boiler 102 through the supply line 112. The boiler 102 preferably generates steam at an operating pressure of "7" to "15" psig. Upon reaching the expander 114, the steam causes the expander 114 to spin. Rotation of the expander 114 drives the fan 122 via endless belt 124a, causing cool air to be drawn into the housing 126 through the air inlet 128 as shown by arrow A.

Due to the extraction of mechanical energy, the steam pressure exiting the expander 114 is lower than the steam pressure being supplied to the expander 114 from boiler 102. After leaving the expander 114, the lower pressure steam flows to the heat exchanger 116. The heat exchanger 116 may comprise a network of closely spaced hollow tubes through which the steam flows and condenses. The boiler 102, supply line 112, return line 118 and pump 120 (i.e., the circulation path), are preferably hermetically sealed and the heat exchanger 116 is preferably configured to run at vacuum steam pressure (relative to atmospheric pressure). For example, heat exchanger 116 may operate (i.e., condense steam) at steam pressures below 14.7 psia, which is the standard value for atmospheric pressure. As cool air is forced past the tubes of the heat exchanger 116 by fan 122, it is heated. The heated air is then forced, again under operation of the central fan 122, through the air outlet 130 as shown by arrow B and into at least some of the various rooms of the space being heated by the arrangement of ducts.

Heat transfer occurring at the heat exchanger 116 causes the steam disposed therein to condense. The condensate exiting the heat exchanger 116 is then returned to the boiler 102. More specifically, the expander 114 drives pump 120 via second endless belt 124b. The pump 120, which is coupled to the return line 118, forces low pressure condensate exiting heat exchanger 116 back to the higher pressure boiler 102, completing the cycle of the working fluid.

When the temperature at the thermostat rises above a preselected level, the controller 106 closes the fuel valve 109 deactivating the burner 104. With the burner 104 deactivated, the boiler 102 begins to cool down. Nonetheless, even as it cools down, the boiler 102 will continue to produce steam, although the pressure of the steam being produced at this point will be less than the maximum operating pressure of the boiler 102. This lower pressure steam is still provided to the expander 114 and heat exchanger 116, as described above. Since the expander 114 is able to expand the steam to pressures below atmospheric through the closed nature of the circulation path, the expander 114 is still able to extract sufficient energy from this lower pressure steam to drive the fan 122 and the pump 120. Similarly, the steam exiting the expander 114 will still have sufficient pressure and temperature to allow the heat exchanger 116 to heat room air.

For example, heat exchanger 116 is preferably configured to condense steam at a saturation pressure of at least as low as "7" psia. The condensing temperature of steam at "7" psia, moreover, is approximately "175" degrees Fahrenheit. Assuming return air from the building enters the heat exchanger at approximately "70" degrees Fahrenheit, a sufficient temperature differential still exists to heat room air to "140" degrees Fahrenheit, which is the desired operating temperature. Expander 114 is also configured to power the fan 122 and pump 120 whenever the pressure being produced by the boiler is above the minimum saturation pressure for useful operation of the heat exchanger (e.g., "7" psia). As a result, continued heating may take place even though the burner 104 has been deactivated. In fact, the system 100 may continue to provide heat transfer until the pressure at the heat exchanger 116 falls below approximately "3" psia.

At some point, the steam exiting the boiler 102 will not have sufficient pressure to drive the expander 114 or condense within the heat exchanger 116, stopping the flow of warm air to the space being heated. Further cooling of the boiler 102, moreover, will suspend the production of steam entirely. Nonetheless, as shown, the present system 100 is able to extract a significant portion of the heat energy used to heat the boiler to its operating temperatures and pressures and use this energy to heat the corresponding space. System 100 is thus much more efficient than prior designs.

The system 100 may also be used to produce a supply of hot water. Here, a separate feed pipe 132 is connected to the supply line 112 carrying steam from the boiler 102. The feed pipe 132 provides steam to a heating coil 134 disposed inside a hot water tank 136. A return pipe 138 transfers condensate exiting the heating coil 134 to the boiler 102. Water to be heated is provided to the tank 136 via an inlet 140. As water in the tank 136 flows around the coil 134, it is heated. Hot water may then be drawn out of the tank 136 via an outlet 142. A steam valve 144 may be disposed in the feed pipe 132 to shut off or adjust the flow of steam being provided to the coil 134 in the tank 136.

A hot water mechanical, thermostatic controller 146, may be utilized to adjust and/or maintain the temperature of the water in the tank 136. The controller 146 preferably includes a thermostat (not shown) that monitors the temperature of the water in the tank 136. The controller 146 may be operably connected to the valve steam 144 such that the controller 146 may open and close the valve 144. When the temperature of the water in the tank 136 falls below a preset value, the hot water controller 146 preferably moves the steam valve 144 from a closed to an open position, allowing steam to flow to the coil 134 and heat the water in tank 136. When the temperature of the water in the tank 136 reaches a certain level, the hot water controller 146 preferably moves the steam valve 144 to the closed position.

It should be understood that the controller 146 may alternatively be coupled to the burner 104 such that the controller 146 may activate the burner 104, causing the boiler 102 to generate steam that is then supplied to the coil 134. Similarly, the controller 146 may de-activate the burner 104, thereby suspending the flow of steam to the coil 134.

Additionally, a second steam valve (not shown) may be disposed in the supply line 112 downstream of the connection to feed pipe 132. The second steam valve, moreover, may be operated manually or by the controller 146. By closing the second valve, steam is prevented from reaching the expander 114 and heat exchanger 116. This stops the flow of warm air to the building or home despite continued operation of the boiler 102. Accordingly, the system 100 may be utilized during warm weather to simply heat water in tank 136 without requiring steam to travel through the expander 114 or heat exchanger 116 and thereby providing undesired hot air to the building or home.

As set forth herein, the present invention is a completely self-powered, space heating system requiring no outside electrical power. That is, the system 100 will continue to produce heat despite a loss of electrical power to the home or building being heated. The system 100 also provides a supply of hot water, again without relying on electricity. Furthermore, as shown in the illustrative embodiment of FIG. 1, the system 100 requires few parts and is substantially refined and improved over the prior art systems. Notably, the system 100 allows for operation with vacuum steam pressures, thereby significantly increasing the power output of the expander 114. As a result, the available power of present system 100 is about double that of the prior art SelecTemp system for the same air heating temperature condition. Furthermore, at different times during operation of the system, the pressure in the boiler and the heat exchanger may both be above atmospheric pressure, both be below atmospheric pressure, or in a state where the pressure in the boiler is above atmospheric while the pressure in the heat exchanger is below atmospheric pressure.

The use of a vacuum heat exchanger 116 specifically makes feasible the configuration of the system 100 wherein the steam from a low pressure boiler 102 can produce enough mechanical power to operate a central forced air heating system (e.g., a central fan). That is, as previously mentioned, heat exchanger 116 is preferably configured to provide steam condensation at pressures below atmospheric pressure. Also, since the heat exchanger 116 and the expander 114 are all preferably located in close proximity to the boiler 102 (e.g., within the single housing 126), the thermal losses experienced with the prior art systems are avoided and installation and maintenance is simplified. The system 100 may also be readily installed as a replacement system in buildings with preexisting forced hot-air furnaces, since the system 100 can utilize the existing arrangement of ducts.

Figure 2:
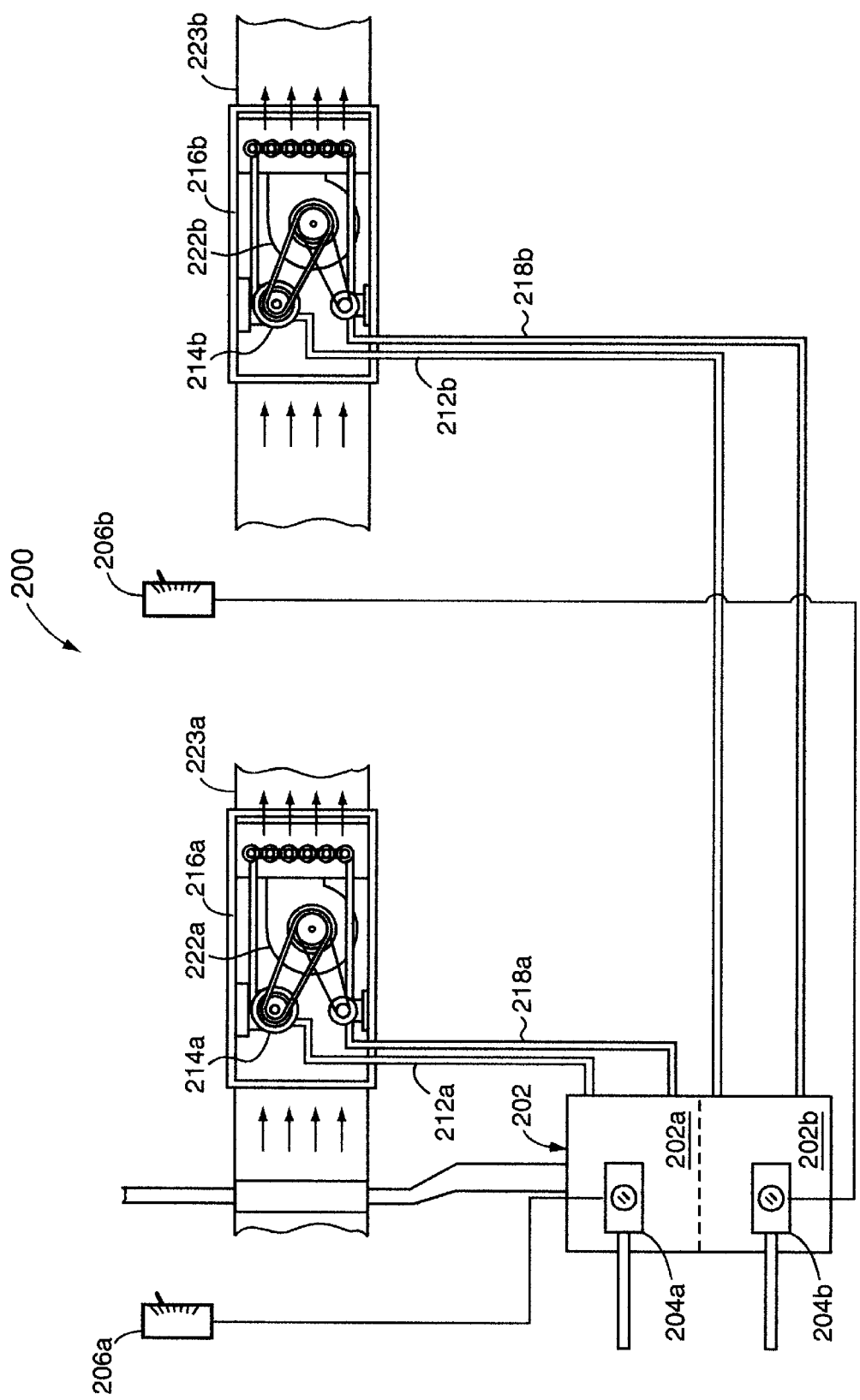
FIG. 2 is a block diagram of another embodiment of a self-powered heating system in accordance with the present invention.

It should be understood that the heating system of the present invention may also provide multiple heating "zones" within the building or home being heated. FIG. 2 depicts a two-zone heating system 200. The system 200 includes a boiler 202 that is divided into two segments 202a and 202b. Associated with each segment 202a, 202b of boiler 202 is a separate burner 204a, 204b, steam supply line 212a, 212b and return line 218a, 218b, respectively. Also associated with each segment 202a, 202b of boiler 202 and connected to the corresponding lines is an expander 214a, 214b, heat exchanger 216a, 216b and fan 222a, 222b. Each corresponding expander 214a, 214b, heat exchanger 216a, 216b and fan 222a, 222b, moreover, is disposed in a separate conduit 223a, 223b. Each conduit 223a, 223b is connected to a particular segment of ducts (not shown) that feeds warm air only to a particular section of the building or home. Each heat exchanger 216a, 216b still remains in close proximity to the boiler 202. That is, both heat exchangers 216a, 216b are preferably in the same room or within approximately twenty-five (25) feet of the boiler 202, unlike the prior art SelecTemp system.

A controller 206a, 206b associated with each burner 204a, 204b is preferably disposed in each section of the building or home and includes a thermostat (not shown). By adjusting each controller 206a, 206b, the temperature in the corresponding section of the building or home may be independently maintained or adjusted. More specifically, controller 206a may be set to activate the corresponding burner 204a at a lower room temperature than controller 206b. Upon activation of burner 204a, steam is provided via supply line 212a to expander 214a and heat exchanger 216a. Consequently, cool air is heated by the heat exchanger 216a and forced via fan 222a into the section of the building or home that is coupled to conduit 223a. Nonetheless, segmentation of the boiler 202 prevents steam from being provided to supply line 212b, expander 214b and heat exchanger 216b solely upon activation of burner 204a. Consequently, warm air is not provided to the section of the home coupled to conduit 223b. The two-zone heating system 200 thus permits independent control of the temperature within given sections of the building or home.

It should be understood that the system, rather than having a plurality of burners, may include a single burner and a plurality of lines and moveable valves so as to selectively provide steam to the desired heat exchanger.

It should be further understood that three or more zones may be similarly provided.

Figure 3:
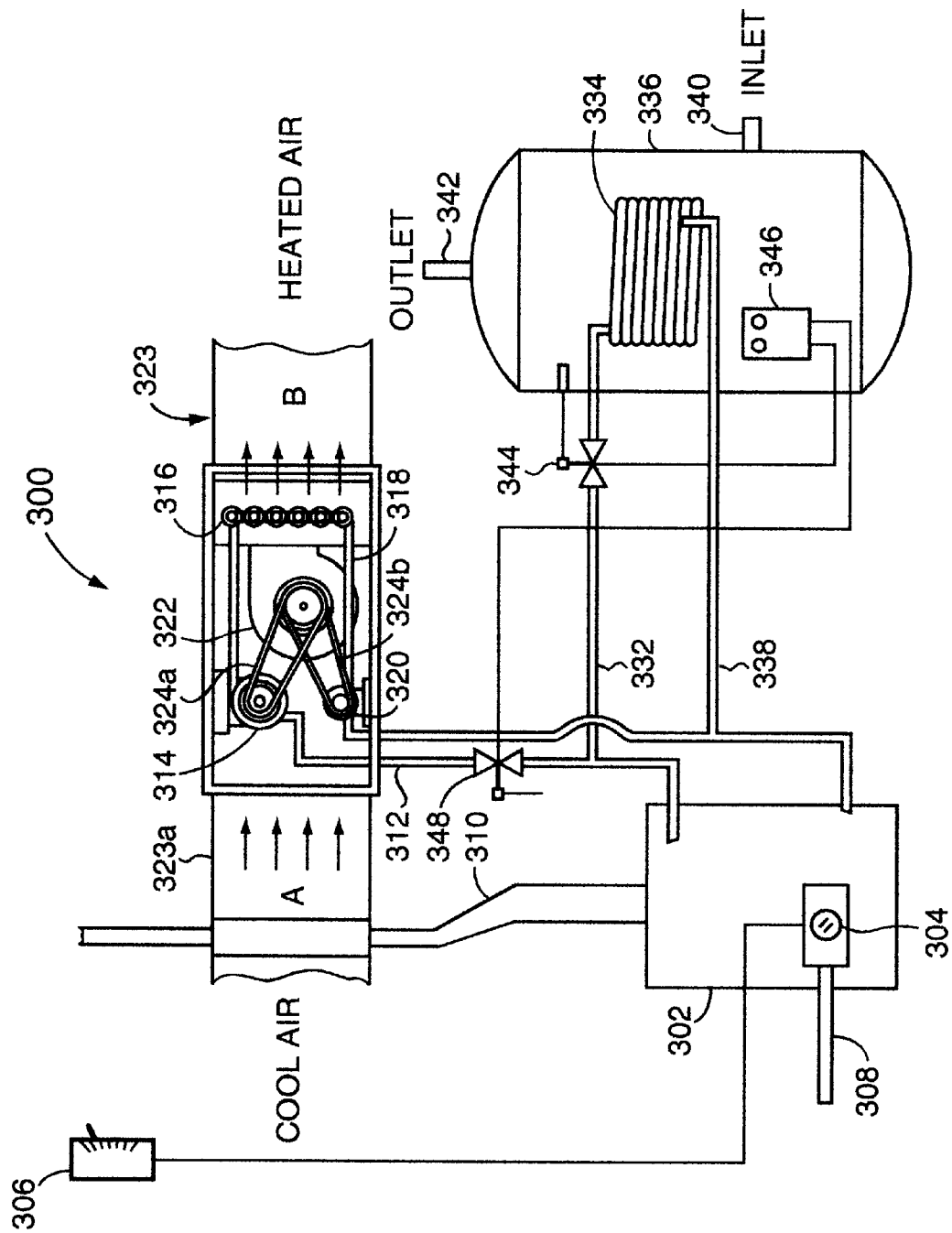
FIG. 3 is a block diagram of another embodiment of a self-powered heating system in accordance with the present invention.

FIG. 3 is a block diagram of another embodiment of the present invention similar to the system 100 of FIG. 1. A heating system 300 includes a boiler 302 having a burner 304 extending therein. A controller 306 including a thermostat (not shown) controls the operation of the system 300 and a gas line 308 provides fuel to the burner 304. An exhaust stack 310 extends away from the boiler 302 and removes combustion products generated by burner 304. A steam supply line 312 is coupled to the boiler 302 and provides steam first to an expander 314. From the expander 314, steam is provided to a heat exchanger 316. Condensate exits the heat exchanger 116 via a return line 318. A pump 320 is coupled to the return line 318 so as to force condensate back to the boiler 302. A fan 322 is preferably disposed adjacent to the heat exchanger 316 to force room air to be heated past the heat exchanger 316. Expander 314 drives fan 322 and pump 320 by a pair of endless belts 324a, 324b.

As shown, the heat exchanger 316 and fan 322 are preferably disposed within a conduit 323. The conduit 323, moreover, is coupled to an arrangement of ducts (not shown) for delivering air heated by the heat exchanger 316 to at least some of the rooms of the corresponding building or home. In particular, fan 322 draws cool room air into the conduit 323 as shown by arrows A and forces the air past the heat exchanger 316 as shown by arrows B. The warmed air is then provided to the corresponding space. The conduit 323 containing the heat exchanger 316 and fan 322 are in close proximity (i.e., within the same room or within approximately twenty-five feet) to the boiler 302 so that extensive supply and return lines 312, 318 need not be employed. For example, the entire heating system 300 (not including the duct work) may be located in the basement of the space being heated, unlike the prior art SelecTemp system.

As with system 100 (FIG. 1), a separate feed pipe 332 may be connected to the supply line 312 to provide steam to a heating coil 334 disposed inside a hot water tank 336. A return pipe 338 transfers condensate exiting the heating coil 334 to return line 318. Water to be heated is provided to the tank 336 via an inlet 340 and heated water may be drawn out of the tank 336 via an outlet 342. A steam valve 344 may be disposed in the feed pipe 332 to shut off or adjust the flow of steam therein.

A hot water mechanical, thermostatic controller 346, may similarly be utilized to adjust and/or maintain the temperature of the water in the tank 336. The controller 346 preferably includes a thermostat (not shown) for monitoring the temperature of the water in the tank 336. The controller 146 may be operably connected to the valve 344 to govern movement thereof. Additionally, a second steam valve 348 may be disposed in the supply line 312 downstream of the connection to feed pipe 332. Second steam valve 348, moreover, may be operated manually or by the controller 346. By closing the second steam valve 348, steam is prevented from reaching the expander 314 and heat exchanger 316. This stops the flow of warm air to the building or home despite continued operation of the boiler 102 and heating water in tank 336.

Operation of system 300 is similar to the operation of system 100 (FIG. 1), described above, and will not be repeated here. To improve the efficiency of the system 300, exhaust stack 310 may be directed to pass through a cool air side 323a of the conduit 323. Since the exhaust gases exiting the boiler 302 typically have a higher temperature than the cool air in the conduit 323, having the exhaust stack 310 pass through the cool side 323a of the conduit 323 allows heat to be transferred from the exhaust gases to the cool air in the conduit 323. This effectively pre-heats the cool air in the conduit 323, improving the overall efficiency of the system 100.

Figure 4:
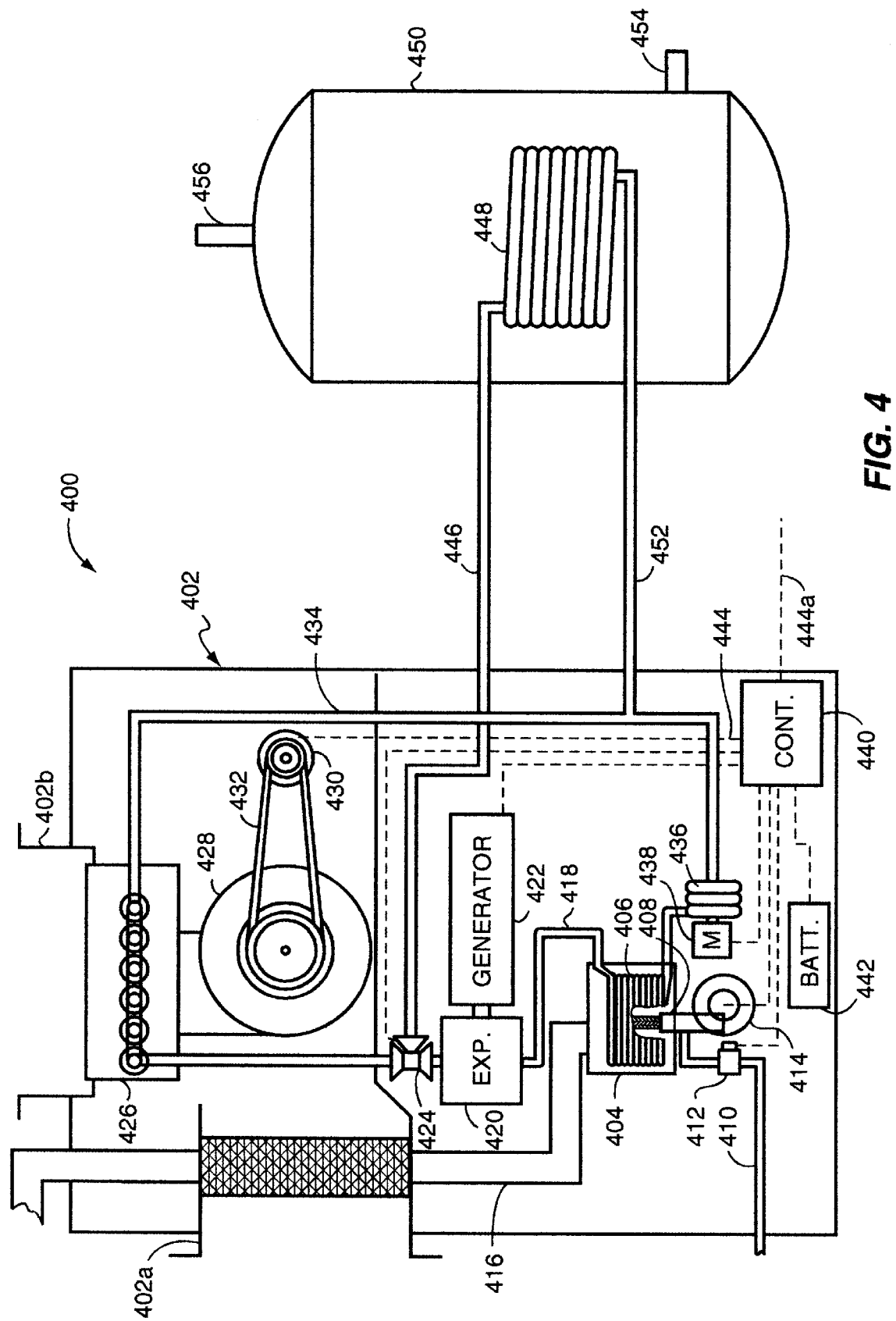
FIG. 4 is a block diagram of yet another embodiment of a self-powered heating system in accordance with the present invention.

FIG. 4 is a block diagram of yet another embodiment of the self-powered heating system of the present invention. A heating system 400 capable of providing a source of supplemental electrical power includes a high pressure water heater 404 (as opposed to a low pressure boiler). Disposed within the water heater 404 is a heating element 406 through which high pressure water flows. Heating element 406 is preferably formed from a small diameter helical coil having fins to improve heat transfer. A burner 408 extends into the water heater 404. Burner 408 preferably operates on a gaseous hydrocarbon fuel which may be provided by a gas line 410 and regulated by a fuel valve 412. Combustion air may be provided under pressure to burner 408 by a combustion air fan 414 which also forces combustion gases through the heater 404 and into an exhaust stack 416. It should be understood that the burner 408 may also operate under natural draft conditions.

Heating element 406 of heater 404 is preferably connected to an expander 420 by means of a supply line 418 so that high pressure, hot water may flow from element 406 to the expander 420. The expander 420, in turn, is operably coupled to a generator 422. Hot water and/or steam exiting the expander 420 preferably passes through a three-way valve 424 and is delivered to a heat exchanger 426. A central air blower 428 is preferably disposed adjacent to the heat exchanger 426. The heater 404, expander 420, generator 422, heat exchanger 426 and blower 428 of the system 400 are all preferably mounted within a housing 402 having an air inlet 402a and an air outlet 402b. In particular, the central air blower 428 and the heat exchanger 426 are preferably arranged within the housing 402 so that the blower 428 may draw cool room air into the housing 402 via air inlet 402a and force it past the heat exchanger 426 and out the air outlet 402b. The air outlet 402b, moreover, is preferably connected to an arrangement of ducts (not shown) which lead to one or more of the various rooms of the space being heated. The central air blower 428 may be powered by an electric motor 430 which is operably coupled thereto (e.g., by endless belt 432).

A return line 434 connects the heat exchanger 426 to the water heater 404 so that condensate exiting the heat exchanger 426 may be returned to the water heater 404. A water pump 436, preferably disposed within the return line 418, maintains the water in the heater 404 at a high pressure, e.g., in excess of "100" psia. The pump 436 is preferably powered by an electric pump motor 438. The system 400 further includes a main controller 440 that is coupled to the generator 422 for receiving electrical power therefrom. The main controller 440 is also operatively connected to the valve 424, electric motor 430, pump motor 438 and a battery 442, as shown by dashed lines 444. As described below, main controller 440 governs the operation of the heating system 400 and provides supplemental electric power to a utility grid (not shown) via electric outlet line 444a. Controller 440 is preferably coupled to a thermostat (not shown) disposed in the space being heated.

In response to a call for heat at the thermostat, the main controller 440 activates the combustion fan 414 and the water pump 438 and opens the fuel valve 412. To perform these functions, controller 440 may utilize a small amount of power from the electric utility grid via line 444a. If electric power is unavailable (e.g., during an electrical outage), controller 440 may utilize power stored in the battery 442 to start the heating system 400, as described above. Fuel entering the burner 408 is ignited thereby heating the high pressure water disposed in the heating element 406 of heater 404. Burner 408, combustion fan 414 and heater 404 are all preferably configured so as to heat the water in element 406 to a temperature near the boiling point for the corresponding operating pressure (e.g., "467" degrees Fahrenheit at "500" psia). High pressure, hot water exits the heater 404 at supply line 418 and enters the expander 420 which extracts mechanical energy from the high pressure, hot water, thereby reducing the pressure (e.g., to "7" psia) and causing at least a portion thereof to be flashed to steam. Mechanical energy extracted by expander 420 is used to drive the generator 422. That is, the expander 420 is preferably coupled to the generator 422 by suitable means (e.g., a drive shaft, belt, etc.) so as to spin the generator 422. Operation of the generator 422 by the expander 420 results in a supply of electrical power which is provided to the controller 440. Once the controller 440 begins to receive electrical power from the generator 422, it no longer needs to rely on the electric utility grid or the battery 442 to operate the heating system 400.

The expander 420 can be of a positive displacement or turbo-dynamic device design for converting high pressure, hot water to mechanical power, such as a rotary vane or screw motor similar to that described in U.S. Pat. No. 4,437,308 entitled Rotary Heat Engine the specification of which is hereby incorporated by reference in its entirety or a turbine similar to that described in U.S. Pat. No. 4,298,311 entitled Two-Phase Reaction Turbine the specification of which is hereby incorporated by reference in its entirety. Since a portion of the high pressure, hot water will flash to steam during expansion, the expander should be capable of operating under two-phase flow (i.e., water and steam).

Hot water and steam exiting the expander 420 is then provided to the heat exchanger 426 and is condensed to heat room air being forced past the heat exchanger 426 by tie blower 428. In particular, the controller 440, utilizing electric power supplied by the generator 422, activates the blower motor 430 which, in turn, drives the blower 428. Operation of the blower 428 causes room air to be drawn into the air inlet 402a of the heating system 400 and forced past the heat exchanger 426 causing it to be heated. Warm room air may then be distributed throughout the space being heated by the ducts coupled to the air outlet 402b. Condensate exiting the heat exchanger 426 flows back to the heater 404 via return line 434. Water pump 436, which may be disposed in the return line 434, maintains the water pressure in the heater 404 at the desired high operating pressure (e.g., "500" psia).

As shown, system 400 is a self-powered heating system for heating a home or commercial building that is capable of operating without external electric power. Indeed, by utilizing high pressure, hot water, system 400 is able to generate excess electrical power beyond the needs of the electrical components included therein. This excess electrical power may be utilized by the corresponding home or building and/or distributed to the corresponding electrical power grid. In particular, expander 420 and generator 422 are preferably sized and configured to supply more electrical power than necessary to run the system 400 at its operating pressures and temperatures. To improve efficiency, a portion of the exhaust stack 416 may be positioned proximate to the air inlet 402a so as to preheat the room air entering the heating system 400. The controller 440, moreover, may be configured to recharge the battery 442 while electrical power is being supplied by the generator 422.

The system 400 may also be configured so as to heat a domestic supply of water with a portion of the hot water and steam exiting the expander 420. In particular, a feed pipe 446 may be connected to the valve 424 so as to divert some or all of the water or steam exiting the expander 420 to a heating coil 448 disposed in a hot water tank 450. A return pipe 452 transfers condensate exiting the heating coil 448 to the return line 434. Water to be heated is provided to the tank 450 via an inlet 454. As water in the tank 450 flows around the coil 448, it is heated. Hot water may then be drawn out of the tank 450 via an outlet 456. The valve 424, which may be electrically activated, preferably adjusts the flow of hot water and steam being provided to the coil 448 under the command of controller 440.

It should be understood that for a given pressure the efficiency with which mechanical energy may be extracted from steam is greater than the efficiency with which mechanical energy may be extracted from hot water at the same pressure. A heating system utilizing high pressure steam (e.g., above "100" psia), however, would be extremely expensive and present significant risk of injury should a failure occur. Moreover, the efficiency with which mechanical energy can be extracted from high pressure, hot water is nevertheless still high. For example, the thermodynamic efficiency of a two phase (water and steam) system having a "500" psia heater and a "7" psia heat exchanger is nearly two-thirds of the efficiency of a steam cycle system operating at the same pressures. Accordingly, a high pressure water system, as disclosed above, although slightly less efficient overall than a steam cycle system can nonetheless be economically designed and manufactured and is safer to operate than high pressure steam systems.

FIG. 5 is a block diagram of yet another embodiment of the self-powered heating system of the present invention. This embodiment similarly produces a supply of electrical power as described with reference to FIG. 4, but also provides a supply of hot water (as opposed to forced hot air) for use in heating the corresponding space. Specifically, a heating system 500 includes a water heater 504 having a high pressure heating element 506 and a burner 508 extending therein. The burner 508 preferably operates on a gaseous hydrocarbon fuel which may be provided by a gas line 510 and may be regulated by a fuel valve 512. Combustion air may be provided under pressure to burner 508 by an electrically powered combustion air fan 514 which also forces combustion gases through the heater 504 and into an exhaust stack 516.

High pressure, hot water exits the heating element 506 of the heater 504 through a supply line 518 and is preferably first provided to an expander 520, which is operably coupled to a generator 522. Hot water and/or steam exiting the expander 520 preferably passes through a three-way, electrically operated, valve 524 and is delivered to a heat exchanger 526. The heat exchanger 526 includes a coil 528 that is disposed within a water chamber 530. The water chamber 530 includes a water inlet line 530a for receiving water to be heated and a water outlet line 530b which may be connected to a plurality of radiators or other beat transfer devices (not shown) disposed within the space being heated by an arrangement of pipes (not shown). An electrically driven primary water pump 532 may be disposed within the water inlet line 530a for forcing water to be heated through the water chamber 530 and into the corresponding radiators. A series of return water pipes (not shown) convey cooled water exiting the radiators to the water inlet line 530a.

Condensate exiting the heat exchanger 526 flows back to the water heater 504 through a return line 534. A secondary water pump 536, preferably disposed within the return line 534, maintains the water flowing through element 506 of heater 504 at a high pressure, e.g., in excess of "100" psia. The secondary water pump 536 is preferably powered by an electric pump motor 538. A controller 540 is operably connected to the generator 522, valve 524, primary water pump 532, secondary water pump motor 538 and a battery 542, as shown by dashed lines 544. As described below, controller 540 governs the operation of the heating system 500 and provides supplemental electric power to a utility grid (not shown) via electric outlet line 544a. Controller 540 is preferably coupled to a thermostat (not shown) disposed in the space being heated.

In response to a call for heat at the thermostat, controller 540 activates combustion fan 514 and secondary water pump motor 538 and opens the fuel valve 512, causing burner 508 to begin heating the high pressure water in the heating element 506. As described above with reference to FIG. 4, the controller 540 may obtain the necessary electrical power from the battery 542 or the electric utility grid via line 544a. Water heater 504, burner 508 and element 506 are similarly configured to heat the high pressure water to a temperature near the boiling point for the corresponding operating pressure (e.g., "500" psia). High pressure, hot water exits the heater 504 at supply line 518 and enters the expander 520, causing it to spin and, thereby, powering the generator 522. Again, the expander 520 is coupled to the generator 522 by suitable means, e.g., a drive shaft, belt, etc. Electrical power obtained through operation of the generator 522 is provided to the controller 540.

Hot water and steam exiting the expander 520 is then provided to the heat exchanger 526 and flows through the coil 528 heating the water disposed in water chamber 530. The controller 540, utilizing electric power supplied by the generator 522, also activates the primary water pump 532, which, in turn, forces cool water into the chamber 530 and drives warm water from the water chamber 530 and into the radiators or other heat transfer devices disposed within the building. Condensate exiting the coil 528 of the heat exchanger 526 flows back to the water heater 504 via return line 534. Secondary water pump 536 maintains the water pressure in the heater 504 at the desired high operating pressure (e.g., "500" psia). It should be understood that the water supply flowing through the water heater 504, expander 520 and coil 528 is completely separate from the water supply flowing through the water chamber 530 and the radiators.

Similar to system 400 of FIG. 4, the self-powered heating system 500 may also be configured to heat a domestic supply of water. Specifically, a feed pipe 546 may be connected to the valve 524 so as to divert some or all of the water or steam exiting the expander 520 to a water tank coil 548 disposed in a hot water tank 550. A return pipe 552 transfers condensate exiting the tank coil 548 to the return line 534. Water to be heated is provided to the tank 550 via an inlet 554 and heated water may be drawn out of the tank 550 through an outlet 556. The valve 424, under operation of the controller 540, preferably adjusts the flow of hot water and steam being provided to the tank coil 548.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A self-powered space heating system, the heating system comprising:

a water heater having a burner and a heating element, the heating element containing high pressure water capable of being heated by the burner;

an expander coupled to the water heater for receiving the high pressure hot water and configured to extract mechanical energy from the high pressure hot water and to discharge hot water and steam;

a generator for producing a supply of electrical power, the generator operatively coupled to the expander such that the mechanical energy extracted by the expander from the high pressure hot water is used to drive the generator;

a heat exchanger coupled to the expander to receive the hot water and steam discharged from the expander; and an air blower disposed proximate to the heat exchanger, the air blower being powered by the supply of electrical power from the generator and arranged to force air to be heated past the heat exchanger and into the space being heated.

2. The heating system of claim 1 further comprising a high pressure water pump coupled to the heating element for maintaining the water in the heater at a high pressure, the pump being powered by the supply of electrical power from the generator.

3. The heating system of claim 2 further comprising a main controller coupled to the generator, the air blower and the pump, the main controller configured to govern the operation of the air blower and the pump in response to electrical power received from the generator.

4. The heating system of claim 3 further comprising a battery coupled to the generator, the battery capable of supplying sufficient electrical power to the main controller for use in the starting the heating system.

5. The heating system of claim 4 wherein the main controller includes a battery recharger component, configured to recharge the battery while electrical power is being received by the main controller from the generator.

6. The heating system of claim 5 further comprising a combustion air fan for providing pressurized combustion air to the burner.

7. The heating system of claim 6 further comprising:

a hot water tank containing a supply of water to be heated;

a heating coil disposed within the tank;

means for conveying at least a portion of the hot water and steam being discharged from the expander to the heating coil so as to heat the supply of water in the water tank; and means for returning hot water and steam from the heating coil to the heater.

8. A self-powered space heating system, the heating system comprising:

a water heater having a burner and a heating element, the heating element containing high pressure water capable of being heated by the burner;

an expander coupled to the water heater for receiving high pressure hot water and configured to extract mechanical energy from the high pressure hot water and to discharge hot water and steam;

a generator for producing a supply of electrical power, the generator operatively coupled to the expander such that the mechanical energy extracted by the expander is used to drive the generator;

a heat exchanger including a coil disposed within a water chamber, the coil coupled to the expander to receive the hot water and steam discharged from the expander; and a primary water pump for forcing a supply of water to be heated through the water chamber and into the space being heated, the primary water pump being powered by the supply of electrical power from the generator.

9. The heating system of claim 8 further comprising a secondary water pump coupled to the heating element for maintaining the water in the heater at a high pressure, the secondary water pump being powered by the supply of electrical power from the generator.

10. The heating system of claim 9 further comprising a main controller coupled to the generator, the air blower and the pump, the main controller configured to govern the operation of the air blower and the pump in response to electrical power received from the generator.

11. The heating system of claim 10 further comprising a battery coupled to the generator, the battery capable of supplying sufficient electrical power to the main controller for use in the starting the heating system.

12. The heating system of claim 11 wherein the main controller includes a battery recharger component, configured to recharge the battery while electrical power is being received by the main controller from the generator.

13. The heating system of claim 12 further comprising a combustion air fan for providing pressurized combustion air to the burner.

14. The heating system of claim 13 further comprising:

a hot water tank containing a supply of water to be heated;

a heating coil disposed within the tank;

means for conveying at least a portion of the hot water and steam being discharged from the expander to the heating coil so as to heat the supply of water in the water tank; and means for returning hot water and steam from the heating coil to the heater.

* * * * *